United States Patent

[11] 3,612,642

| [72] | Inventor | Frank Dostal<br>Elmhurst, Long Island, N.Y. |
| --- | --- | --- |
| [21] | Appl. No. | 837,013 |
| [22] | Filed | June 27, 1969 |
| [45] | Patented | Oct. 12, 1971 |
| [73] | Assignee | Bulova Watch Company, Inc.<br>New York, N.Y. |

[54] A HIGH-VELOCITY OPTICAL SCANNER INCLUDING A TORSIONAL FORK SUPPORTING TWO REFLECTORS
6 Claims, 8 Drawing Figs.

[52] U.S. Cl. ............................................. 350/6,
310/36, 350/285, 331/94.5
[51] Int. Cl. .................................................G02b 17/06,
H01s 3/11
[50] Field of Search............................................. 178/7.6;
331/94.5; 310/36; 350/6, 285

[56] References Cited
UNITED STATES PATENTS

| 3,398,379 | 8/1968 | Sims et al. | 331/94.5 |
| --- | --- | --- | --- |
| 3,437,393 | 4/1969 | Baker et al. | 350/6 |
| 3,521,191 | 7/1970 | Golden et al. | 331/94.5 |

*Primary Examiner*—Ronald L. Wibert
*Assistant Examiner*—Orville B. Chew, II
*Attorney*—Michael Ebert ABSTRACT: A high-velocity optical scanner for laser "Q" switching and other purposes, the scanner including first and second mirrors mounted on the tines of an electronically driven torsional tuning fork, the mirrors being oscillated thereby. An incoming beam of light or other form of radiant energy is directed toward the first mirror which reflects it onto the second mirror, the second mirror directing the beam onto a fixed third mirror. The third mirror acts to duplex the beam by directing it back to the second mirror, which returns the beam to the first mirror, whose reflection produces an exit beam having a high angular velocity.

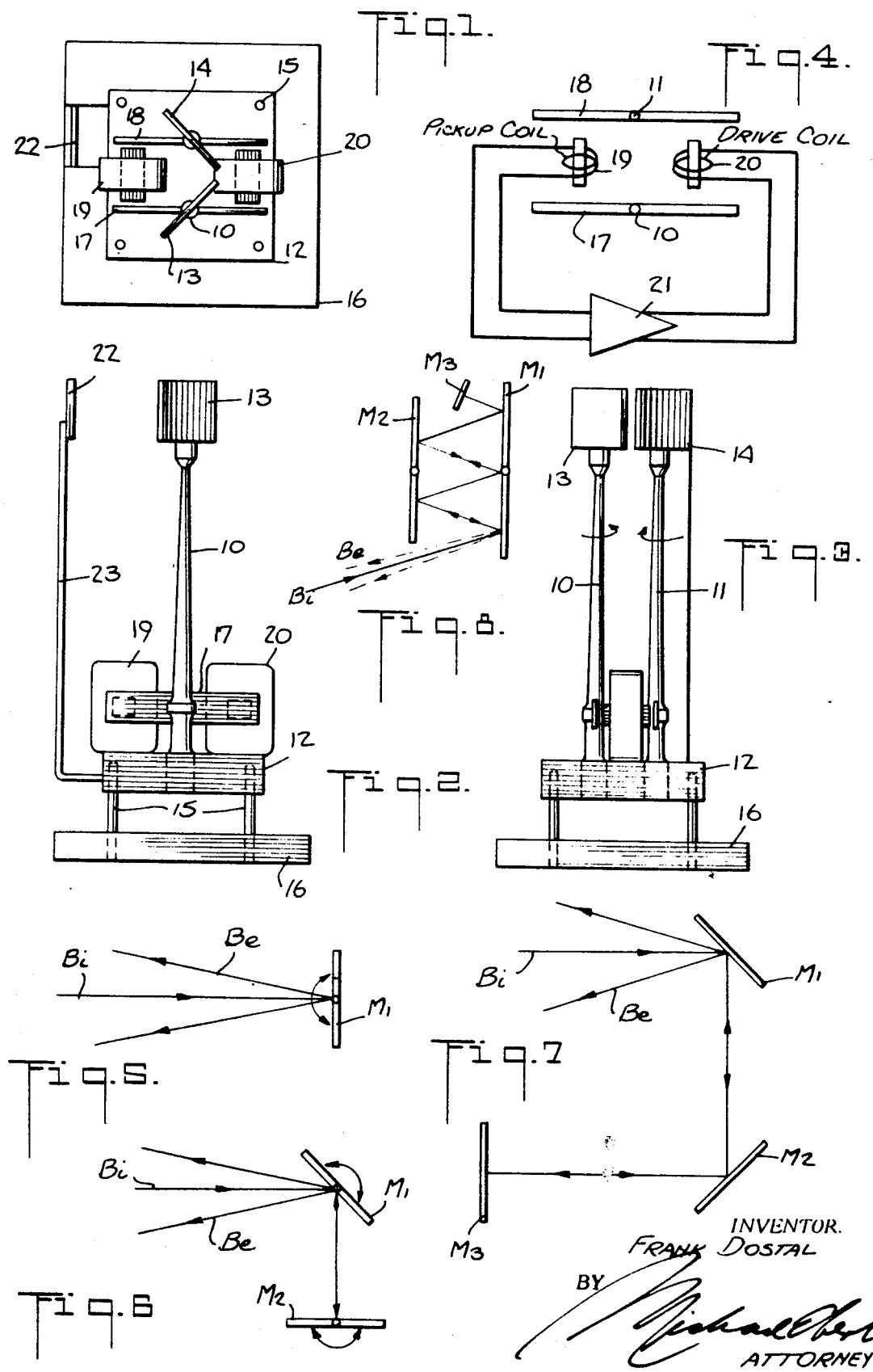

A HIGH-VELOCITY OPTICAL SCANNER INCLUDING A TORSIONAL FORK SUPPORTING TWO REFLECTORS

RELATED APPLICATION

Application Ser. No. 814,649filed Apr. 9, 1969, "Resonant Torsional Oscillators."

BACKGROUND OF INVENTION

This invention relates generally to high-velocity optical scanners, and more particularly to an optical scanner in which reflecting elements mounted on the tines of a torsional fork and acting in conjunction with a fixed reflector provide exceptionally high scanning rates.

The laser constitutes a source of highly coherent radiation at optical wavelengths. It has numerous industrial and military applications, such as in space exploration, communications, target tracking, and optical ranging. In a laser there exists competition between the pumping source seeking to increase the population inversion and the laser action trying to decrease it. Thus the population inversion is limited by the laser action itself, and the power level of the oscillation is restricted.

High instantaneous powers are obtainable by using the "Q" switching mode of laser operation. In "Q" switching, the resonance of the Fabry-Perot cavity is controlled externally so as to substantially eliminate the above-noted competition. In the course of switching, the system is rendered nonresonant and hence of low "Q" during the pumping period when the population inversion is on the rise, thus enabling the degree of inversion to be increased beyond that for an ordinary resonant system. Population inversion goes through a maximum value even in the absence of resonance.

If the system represented by the cavity can be made suddenly resonant, that is, with a high "Q" at or near the time of this maximum population inversion, the energy stored in excited levels is stimulated to emit an intense beam of light. The time necessary for this energy conversion is determined by the amount of energy present and the suddenness by which resonance is approached, i.e., by the rate of change of "Q." If the "Q" is maximized too slowly, the energy will be dissipated before maximum "Q" is attained.

Several techniques are currently in use for "Q" switching at high velocity, such as rotating apertures, spinning prisms or mirrors, and other motor-driven optical scanners. The drive means employed for this purpose are in the form of air turbine motors, high frequency synchronous motors, or DC motors which in some instances include automatic speed control. Kerr cells and bleachable dyes can also provide the switching function but each has practical disadvantages.

The use of motor-driven high-velocity optical scanners has several disadvantages. All such arrangements are characterized by excessive size and weight, relatively high power requirements, lubrication problems as well as noise and wear problems. Moreover, in satellite installations, motors exert a parasitic precession which is difficult to counteract.

BRIEF DESCRIPTION OF INVENTION

In view of the foregoing, it is the primary object of this invention to provide a high-velocity scanner in which two torsionally oscillating mirrors acting in conjunction with a stationary mirror, afford an exceptionally high scanning velocity.

While the invention is of particular value in connection with "Q" spoiling or switching for laser applications, it is to be understood that the invention is not limited to this use and may be employed wherever a high-velocity scanner is indicated.

More specifically, it is an object of the invention to provide a scanner of the above-described type wherein the mirrors are mounted on the tines of an electronically actuated torsional tuning fork.

A significant advantage of the invention is that the torsional fork for vibrating the mirrors has very low power requirements amounting to a small fraction of the power entailed in operating a motor in a conventional high-velocity scanner.

Moreover, the torsional tuning fork is insensitive to gravity, attitude and other factors which adversely affect the operation of standard motor-driven scanners.

Still another object of the invention is to provide an efficient, high-velocity optical scanner which is of inexpensive construction, which is lightweight and compact, and which operates reliably without the need for lubrication or maintenance.

Briefly stated, these objects are attained in a high-velocity scanner in which first and second mirrors are mounted on the free end of the tines of a torsional tuning fork which is electronically driven to cause the mirrors to oscillate in opposing phases about the longitudinal axes of the tines, the second oscillating mirror acting in conjunction with a stationary third mirror in an optical arrangement wherein a light beam or a beam of radiant energy directed at the first mirror is reflected thereby toward the second mirror, which in turn directs the beam toward the third mirror, the third mirror acting to duplex the beam to return it toward the second mirror, which directs it back to the first mirror whose reflection thereof produces an exit beam having a high angular scan velocity.

BRIEF DESCRIPTION OF DRAWINGS

For a better understanding of the invention, as well as other objects and further features thereof, reference is made to the following detailed description to be read in conjunction with the accompanying drawing, wherein;

FIG. 1 is a plan view of a high-velocity optical scanner in accordance with the invention;

FIG. 2 is a side elevation of the scanner;

FIG. 3 is an end elevation of the scanner;

FIG. 4 is a circuit diagram of the torsional oscillator;

FIG. 5 schematically illustrates an optical scanning arrangement employing a single oscillating mirror;

FIG. 6 schematically illustrates an optical scanner arrangement employing two oscillating mirrors;

FIG. 7 schematically illustrates the optical scanning arrangement of the present invention employing two oscillating mirrors operating in conjunction with a stationary mirror; and FIG. 8 illustrates a further variant on FIG. 5.

DESCRIPTION OF INVENTION

Referring now to the drawing, and more particularly to FIGS. 1, 2, and 3, a high-velocity optical scanner in accordance with the invention includes a torsional tuning fork provided with a pair of erect torsional fods or tines 10 and 11 anchored at spaced positions in a rectangular base 12. The principles underlying the behavior of a torsional fork are set forth in greater detail in my U.S. Pat. No. 2,877,365 Mar. 10, 1959).

By mounting first and second optical reflectors or mirrors 13 and 14 on the free ends of tines 10 and 11, respectively, such that the reflectors lie in a common plane in the static condition of the fork, scanning patterns may be obtained as the mirrors oscillate about the longitudinal axes of the tines in phase opposition when the tines undergo torsional motion. The nature of these patterns will later be considered.

The advantages of a torsional fork reside in its freedom from rate changes due to gravity, attitude and acceleration, for all of the restoring force is developed within the tines. The torsional fork is supported by resilient wirelike pins 15 extending between the corners of base 12 and a mounting plate 16 which serve to decrease the coupling of the unit to a hard-surface mount. The pins afford a torsional tolerance while providing a reasonably stable mounting. The compliant mounting also minimizes the transmission of any residual vibrations from the scanner to the mounting.

A torsional-fork scanner of the type described herein is therefore relatively insensitive to shock forces which may arise in hostile environments. The torsional oscillator has a prolonged operating life, there being no need for lubrication or other care, operating wear being almost nonexistent and reliability being of a high order.

The fork is preferably formed of a metal having a low-temperature coefficient of expansion and elasticity to render the fork substantially insensitive to changes in ambient temperature. The tines are therefore made from materials having a high mechanical "Q," long fatigue life, and a good temperature/elasticity coefficient, such as Bulaloy, Elinvar, Elgiloy, or Ni-Span C.

Mounted transversely on tines 10 and 11, and symmetrically positioned thereon are soft iron drive armatures 17 and 18, respectively, the armatures being disposed at corresponding points adjacent the anchored or base ends of the tines. A first electromagnet 19, constituted by a permanent magnet surrounded by a coil, is positioned with the pole pieces of the magnet adjacent end portions of armatures 18 and 19 on one side thereof, while a second electromagnet 20 of similar construction is positioned with its pole pieces adjacent the end portions of the armature on the other side thereof.

Electromagnet 19 serves as a pickup or sensing coil which, as shown in FIG. 4, is connected to the input of an amplifier 21 which in practice, may be a battery-operated single or multistage, solid-state type. The combination of the pickup and drive coils with the amplifier defines a positive feedback oscillator serving to sustain the fork in vibration in a well-known manner.

The resonance frequency of the torsional oscillator is determined by the moments of armatures 17 and 18 and of the mirrors 13 and 14, as well as the dimensions and Young's modulus of the tines. In order to obtain a large swing of the mirrors, it is essential that the torsional swing at the free end of the tines be large. If the driving forces for the fork were applied to armatures located on the tines adjacent the free ends thereof, it would be necessary to have a relatively large gap between the electromagnet pole pieces and the armatures to allow for the movement of the latter. But a large gap would not provide a high magnetic flux density; hence this arrangement would be inefficient.

In the present invention, the driving armatures are mounted adjacent the base of the tines and operate with relatively narrow airgaps providing a high flux density. However though the displacement of the drive armatures is relatively small, the angular swing at the free ends of the tines is quite large because of the mechanical amplification inherent in the structure.

Inasmuch as the ratio of the angular swing of a tine at the armature position with respect to the angular swing of the same tine at its free end is equal to the ratio of the distance between the armature position and the base of the tine and the distance between the armature position and the free end of the tine, the greater the difference between these distances, the larger the angle of swing at the free end as compared to that at the armature position. Hence by placing the armatures near the base of the tines, it becomes possible to drive the rod with a relatively small swing and yet obtain the desired large swing of the mirror on the free end of the tine.

In addition, the mechanical "Q" of the tines enhances the above magnification of motion by an additional factor of about 10times.

In practice, a swing multiplication of 25to 100times may be effected by the armature arrangement disclosed, with a typical mirror motion of 10°, peak to peak, for a torsional fork operating at 1000 H$_x$.

The manner in which a high scanning rate is obtained will now be discussed. In FIG. 5, there is shown an arrangement in which an entry beam B$i$ is directed at mirror M1 oscillating at a frequency of 10° peak to peak, to produce a scan angle of 20° in the exit beam B$e$. Twice the scan angle (80° can be produced in the arrangement of FIG. 6, where the entry beam B$i$ is deflected by the oscillating mirror M1, toward a second oscillator mirror M2, from which the beam is reflected back to mirror M1 whose reflection yields exit beam B$e$.

In the present arrangement, as shown in FIG. 7, incoming beam B$i$ strikes the first oscillating mirror M1, which deflects it toward the second oscillating mirror M2, the second mirror directing the beam onto a stationary mirror M3 which is oriented to provide a duplex action wherein the beam is returned to the second mirror M2 and from there to mirror M1 whose reflection yields an exit beam B$e$ having a 160°scan angle. Stationary mirror M3 is constituted in FIGS. 1 and 2 by a mirror 22 mounted on a bracket 23 attached to base 12. Thus any movement of the resiliently mounted base will not change the relative positions of the three mirrors forming the optical system.

In this optical path, due to a total of four reflections from the two oscillating mirrors M1 and M2, the primary mirror angle is multiplied by $2^4$, or 16 times.

A further configuration capable of even higher scan velocities is shown in FIG. 8. In this case the entry beam B$i$ is reflected from mirror M1 to mirror M2, back to mirror M1 and so on, up to stationary mirror M3, which causes the beam to retrace its course from M1 to M2, etc., and out along and scanning about entry beam B$i$.

The number of reflections taking place from moving mirrors in FIG. 8, is 10, therefore the multiplication of the angle is $2^{10}$, or 1024times. The number of reflections taking place is determined by adjusting the angle of beam B$i$ to mirror M1. The cross section of the beam which can be accommodated, is reduced as the number of reflections goes up.

The peak angular scan rate, which takes place at the center of the output scan, is equal in degrees per second to primary peak-to-peak mirror motion ($\theta$) times the multiplication factor $u$ times frequency of oscillation $f$ in Hertz time $\pi$, or peak scan rate $= \theta u f \pi$ degrees per second.

| Fig. | $\theta$ | Number of reflections (from OSC mirrors) | u | Scan angle | Peak angular scan rate, deg./sec. at 1,000 Hz) |
|---|---|---|---|---|---|
| 5 | 10 | 1 | 2 | 20 | 20,000$\pi$ |
| 6 | 10 | 3 | 8 | 80 | 80,000$\pi$ |
| 7 | 10 | 4 | 16 | 160 | 160,000$\pi$ |
| 8 | 10 | 10 | 1,024 | 10,240 | 1,024,000$\pi$ |

It is to be noted that a 160,000$\pi$degree-per-second scan rate at a 1000 per second repeat rate attained by the torsional-fork scanner would, in the case of a conventional motor-driven scanner require a motor going at 200 revolutions per second (12,000 r.p.m.) and driving a five-sided mirror.

A precise multifaceted mirror and a motor operating at 12,000 r.p.m. would present major difficulties several magnitudes greater than the present scanner structure, wherein relatively small elements oscillate torsionally. The savings in power will be evident when one considers that for a motor-driven scanner, approximately 50 *volt-amperes must be derived from a frequency-controlled source, whereas a torsional fork of the type disclosed herein requires less than one-half volt-amperes of DC power.

For efficient operation, the mirrors are preferably gold plated to minimize reflectivity losses. Inasmuch as the mirrors are subjected to beams of high intensity when used for laser "Q" switching, the reflective surfaces of the mirrors are vulnerable because the heat involved may volatilize the gold surface. To avoid such attack, the mirrors are preferably formed of a substrate of high thermal conductivity, such as copper, aluminum or beryllium. The active surface of the substrate is coated with a thin layer of gold, aluminum or other metal of high reflectivity whereby heat is dissipated by the substrate to prevent injury of the reflective layer. Dielectric surfaces are also used to obtain high and selective reflectivity.

Because of the large angles of deflection, after even the second reflection the maximum total sweep is not realized, for the light beam will run off the edge of the mirror. However, the scan rate is very high and accessible from the center portion of the scan. Also, the arrangement is such that the exit beam can be made coincident with the entry beam, which is very useful in laser "Q" switching.

While there has been shown and described a preferred embodiment of the invention, it will be appreciated that many changes and modifications may be made therein without, however, departing from the essential spirit of the invention.

What I claim is:

1. A high-velocity optical scanner comprising:
   A. a torsional fork having a pair of spaced tines which oscillate about their respective longitudinal axes in phase opposition,
   B. electromagnetic means to sustain the tines of said fork in oscillation,
   C. first and second mirrors mounted on the free ends of the tines to oscillate therewith,
   D. a stationary third mirror disposed to receive reflections from the second mirror, to provide a reflex action, and
   E. means to direct an incoming beam toward said first mirror to be deflected thereby onto said second mirror, and from there onto said third mirror, which returns the beam to said second mirror to be directed back onto said first mirror whose reflection yields an exit beam having a high angular velocity.

2. A scanner as set forth in claim 1, wherein said tines are anchored on a common base which is mounted via a torsional compliance consisting of resilient pins to a mounting plate.

3. A scanner as set forth in claim 2, wherein said third mirror is mounted on a bracket attached to said base.

4. A scanner as set forth in claim 1, wherein said electromagnetic means is constituted by a pair of armatures attached to said tines adjacent the base thereof, a drive electromagnet disposed between said armatures adjacent one end thereof, and a pickup electromagnet disposed between the armatures adjacent the other end thereof.

5. A scanner as set forth in claim 1, wherein said mirrors are constituted by substrates of high thermal conductivity coated with a layer of high reflectivity.

6. A scanner as set forth in claim 5, wherein said layer is gold.